United States Patent
Long

(10) Patent No.: US 8,424,411 B2
(45) Date of Patent: Apr. 23, 2013

(54) PARALLEL ROBOT

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 19 days.

(21) Appl. No.: 13/204,853

(22) Filed: Aug. 8, 2011

(65) Prior Publication Data

US 2012/0079908 A1   Apr. 5, 2012

(30) Foreign Application Priority Data

Sep. 30, 2010 (CN) .......................... 2010 1 0298191

(51) Int. Cl.
*B25J 17/00* (2006.01)
(52) U.S. Cl.
USPC ....................................................... 74/490.05
(58) Field of Classification Search ............... 74/490.01, 74/490.03, 490.05; 901/16, 28
See application file for complete search history.

(56) References Cited

U.S. PATENT DOCUMENTS

| | | | | |
|---|---|---|---|---|
| 5,656,905 A | * | 8/1997 | Tsai | 318/568.21 |
| 6,516,681 B1 | * | 2/2003 | Pierrot et al. | 74/490.01 |
| 2009/0019960 A1 | * | 1/2009 | Nabat et al. | 74/490.03 |
| 2011/0113918 A1 | * | 5/2011 | Zhao | 74/490.05 |

FOREIGN PATENT DOCUMENTS

EP   2221153 A1 * 8/2010

* cited by examiner

*Primary Examiner* — Vicky Johnson
(74) *Attorney, Agent, or Firm* — Altis Law Group, Inc.

(57) ABSTRACT

A parallel robot includes a base, a movable platform, an actuator, and four control arms. The actuator is positioned on the movable platform. The control arms are interconnected between the base and the movable platform. Each control arm includes a driving member connected to the base, an action pole driven by the driving member, and a four-rod linkage assembly interconnected between the action pole and the movable platform. One end of the four-rod linkage assembly is connected to the action pole via a first rotary joint, and the other end of the four-rod linkage assembly is connected to the movable platform via a second rotary joint. An axis of the first rotary joint is substantially parallel to an axis of the second rotary joint.

18 Claims, 5 Drawing Sheets

PARALLEL ROBOT

BACKGROUND

1. Technical Field

The present disclosure generally relates to robotics, and particularly, to a parallel robot having a simplified structure.

2. Description of the Related Art

Parallel robots have the advantages of stability, higher load-bearing capability, favorable weight to load ratio, and other dynamic characteristics among other things, and can be used in many fields.

A commonly used parallel robot includes a base, a movable platform, and six control arms with two ends of the parallel robot pivotally connecting the movable platform and the base, respectively. Each control arm includes an actuator and a movable member driven by the actuator. When the movable members are cooperatively moved by the corresponding actuators, the movable platform can be moved to a predetermined position to realize a displacement having six degrees of freedom. However, the typical parallel robot has a relatively complex construction and control system, thereby making it difficult to control and maintain.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
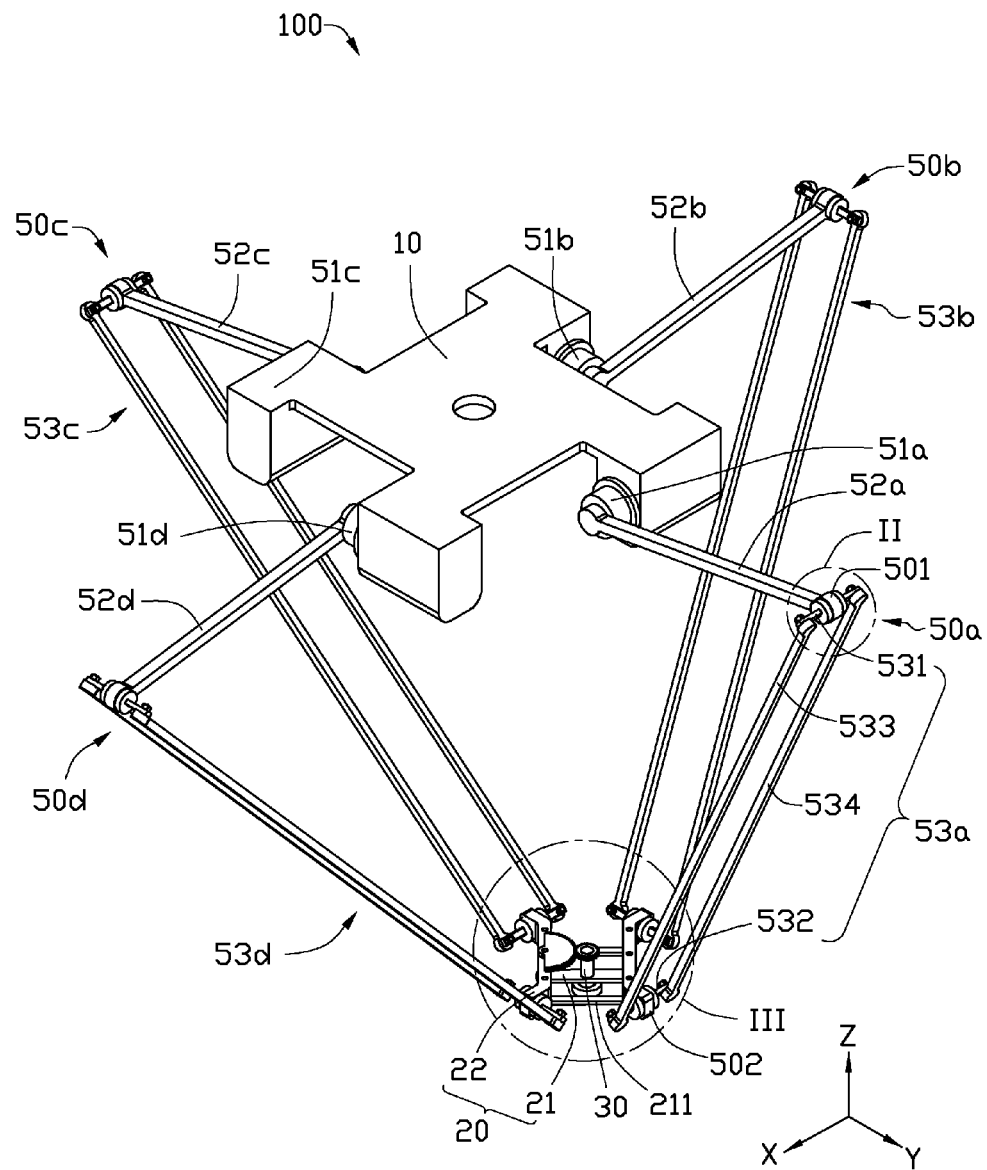
FIG. 1 is an assembled, isometric view of a parallel robot of an embodiment of the present disclosure, the parallel robot including a base, a movable platform, an actuator, and four control arms.
Figure 2:
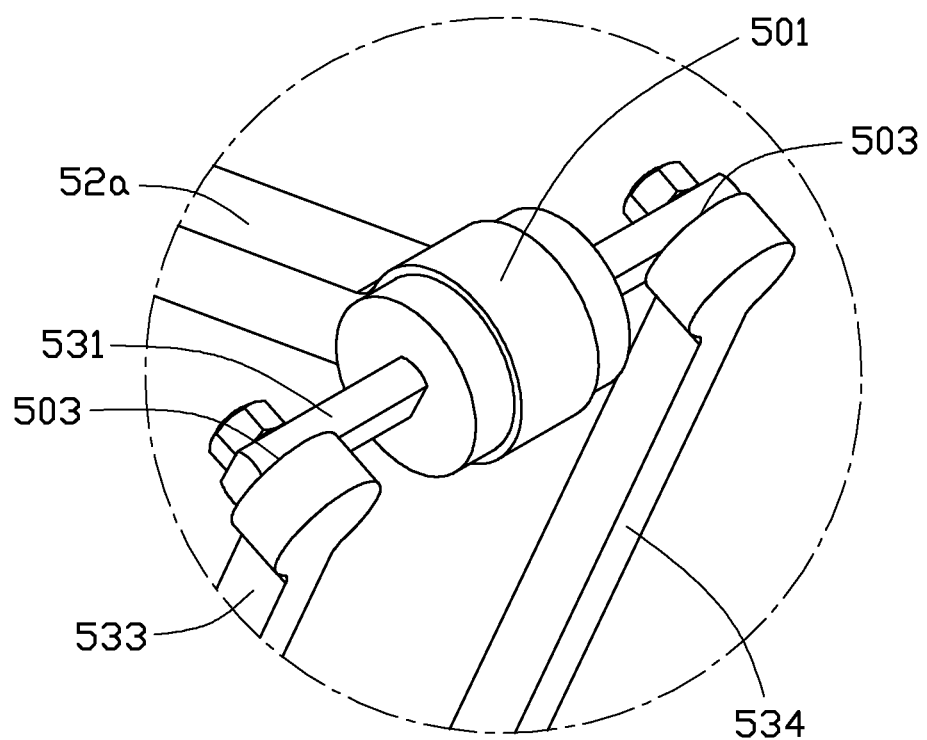
FIG. 2 is an enlarged view of a region II of FIG. 1.
Figure 3:
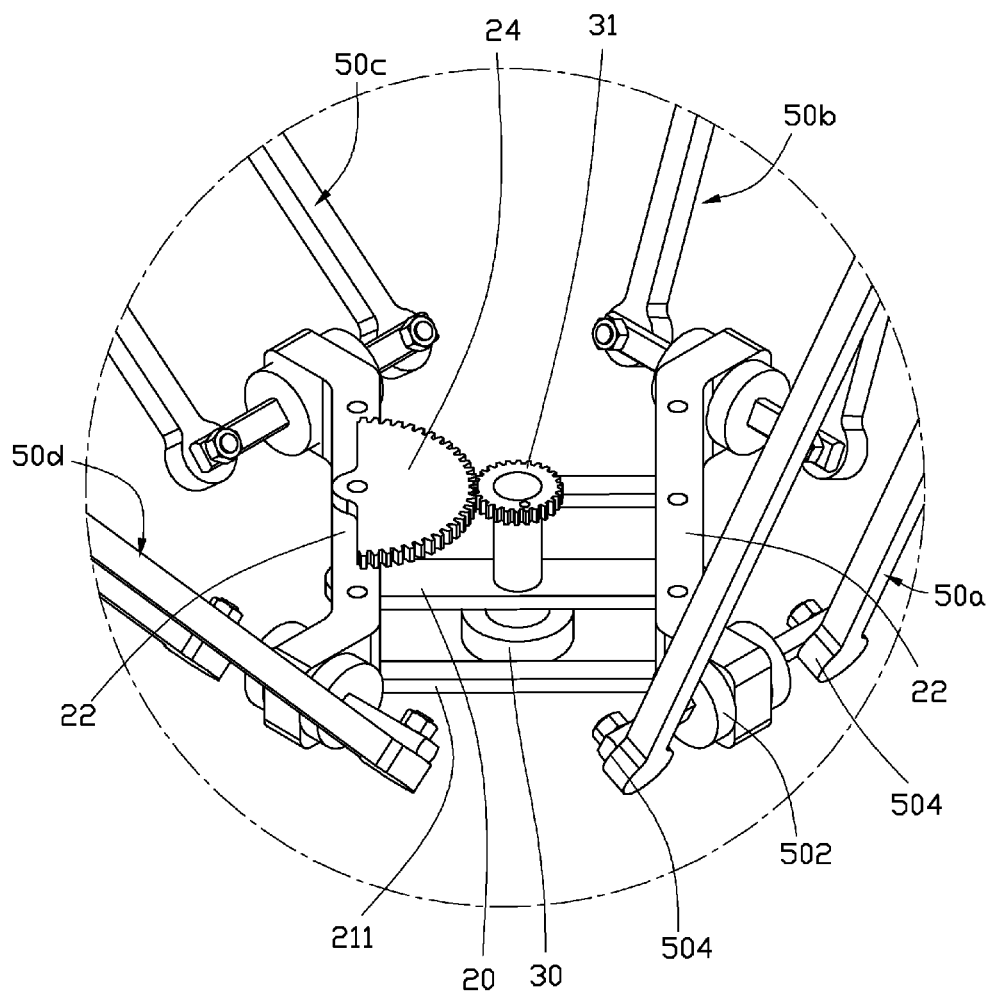
FIG. 3 is an enlarged view of a region III of FIG. 1.

Referring to FIGS. 1 through 3, an embodiment of a parallel robot 100 is shown. The parallel robot 100 includes a base 10, a movable platform 20, an actuator 30 mounted on the movable platform 20, and four control arms 50a, 50b, 50c, 50d rotatably interconnecting the base 10 and the movable platform 20. The movable platform 20 can move along the X-axis, Y-axis, and Z-axis, and rotate about the Z-axis when controlled by the control arms 50a, 50b, 50c, 50d. The actuator 30 may be a gripper or a sucker.

In the illustrated embodiment, the base 10 is substantially rectangular The control arms 50a, 50b, 50c, 50d have the same structure, and are evenly arranged on a periphery of the base 10.

Taking the control arm 50a as an example, the control arm 50a includes a driving member 51a connected to the base 10, an action pole 52a driven by the driving member 51a, and a four-rod linkage assembly 53a interconnecting between the action pole 52a and the movable platform 20. In the illustrated embodiment, the four-rod linkage assembly 53a includes a first connecting rod 531, a second connecting rod 532, a first swing arm 533, and a second swing arm 534. The second connecting rod 532 is parallel to the first connecting rod 531, and the first swing arm 533 is parallel to the second swing arm 534, respectively. Therefore, the first connecting rod 531, the second connecting rod 532, the first swing arm 533, and the second swing arm 534 cooperatively form a parallelogram. The first connecting rod 531 is connected to the action pole 52a via a first rotary joint 501, and the second connecting rod 532 is connected to the movable platform 20 via a second rotary joint 502. As such, an axis of the first rotary joint 501 is substantially parallel to that of the second rotary joint 502. The driving member 51a can be a servo motor. The control arm 50b has a same structure as the control arm 50a, and includes a driving member 51b, an action pole 52b, and a four-rod linkage assembly 53b. The control arm 50c has a same structure as the control arm 50a, and includes a driving member 51c, an action pole 52c, and a four-rod linkage assembly 53c. The control arm 50d has a same structure as the control arm 50a, and includes a driving member 51d, an action pole 52d, and a four-rod linkage assembly 53d.

The movable platform 20 includes a main body 21 and two rotating members 22 positioned on the main body 21 and opposite to each other. The main body 21 includes three fixing plates 211 parallel to one other. The actuator 30 is mounted on one fixing plate 211 located between the two other fixing plates 211. The rotating members 22 and the two other fixing plates 211 cooperatively form a parallelogram. Two adjacent four-rod linkage assemblies 53a, 53b are connected to one rotating member 22 via two second rotary joints 502, and two adjacent four-rod linkage assemblies 53c, 53d are connected to the other rotating member 22 via the other two second rotary joints 502. Therefore, four second connecting rods 532 are evenly arranged around the movable platform 20, and one pair of opposite second connecting rods 532 are parallel to each other.

The movable platform 20 further comprises a first gear 24 fixedly mounted on one rotating member 22. A second gear 31 is fixed on the actuator 30. The actuator 30 can be driven to rotate relative to the movable platform 20 by the rotating members 22, via the first gear 24 and the second gear 31. In the illustrated embodiment, the first gear 24 is a straight-tooth involute gear with semi-circular shape. A radius of the first gear 24 is three times that of the second gear 31, thus a rotating angle of the actuator 30 can be three times that of the rotating members 22. As a result, a range of the rotating angle of the actuator 30 is enlarged.

Referring also to FIGS. 2 and 3, one end of the first and the second swing arms 533, 534 is rotatably connected to the first connecting rod 531 via two third rotary joints 503, respectively. The other end of the first and the second swing arms 533, 534 is rotatably connected to the second connecting rod 531 via the fourth rotary joints 504, respectively. An axis of the third rotary joints 503 is substantially perpendicular to that of the first rotary joints 501. An axis of the fourth rotary joints 504 is substantially perpendicular to that of the second rotary joints 502.

Figure 4:
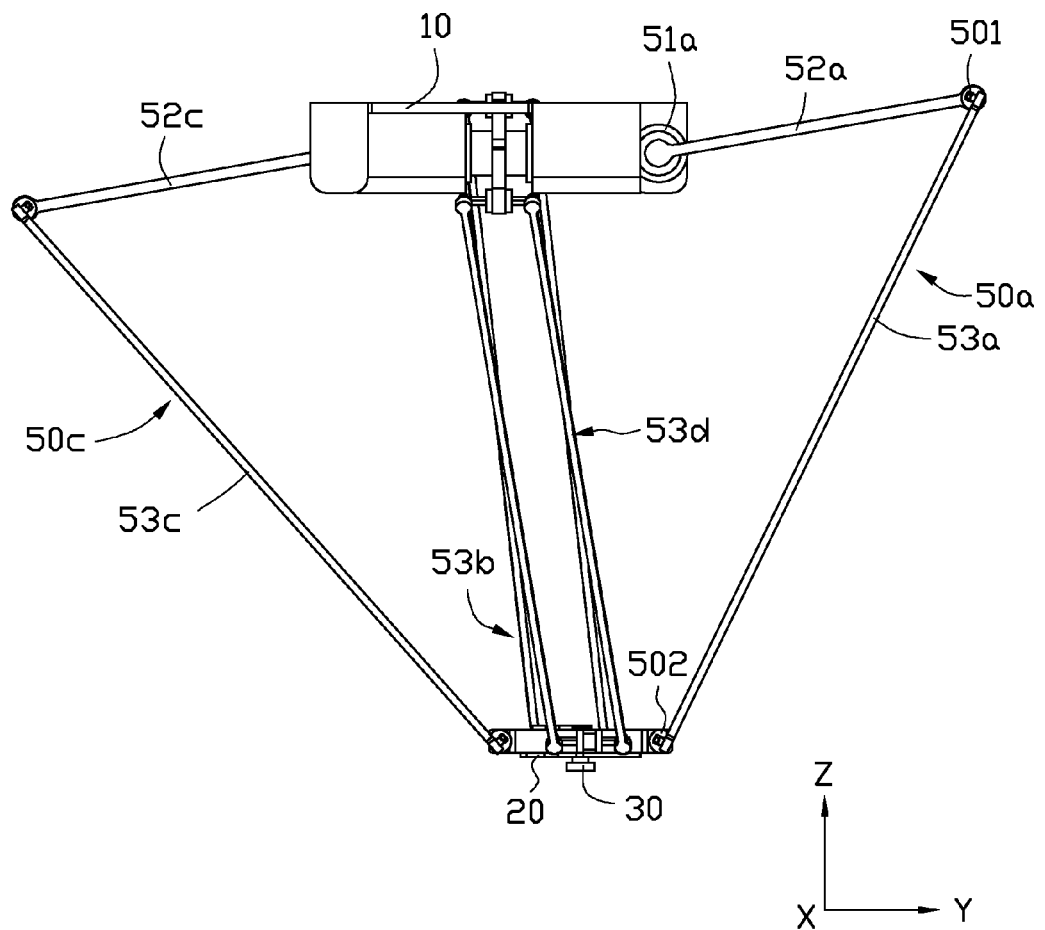
FIG. 4 is an isometric view of the parallel robot of FIG. 1 showing the movable platform moving along the Y-axis.

Referring to FIGS. 1 and 4, in use, when the opposite driving members 51a, 51c of the control arms 50a, 50c drive the action poles 52a, 52c to swing, and the driving members 51b, 51d of the control arms 50b, 50d are not activated, thus, the control arms 50b, 50d will swing together with the control arms 50a, 50c. As a result, the four-rod linkage assemblies 53a, 53c drive the movable platform 20 to move, and the movable platform 20 can only move along the Y-axis due to physical restriction by the four-rod linkage assemblies 53b, 52d (see FIG. 4). Similarly, when the opposite driving members 51b, 51d of the control arms 50b, 50d drive the action poles 52b, 52d to swing, and the driving members 51a, 51c of the control arms 50a, 50c are not activated, thus, the control arms 51a, 51c will swing together with the control arms 50b, 50d. As a result, the four-rod linkage assemblies 53b, 53d drive the movable platform 20 to move, and the movable platform 20 can only move along the X-axis due to physical restriction by the four-rod linkage assemblies 53a, 52c. When the opposite driving members 51a, 51b, 51c and 51d of the control arms 50a, 50b, 50c and 50d drive the action poles 52a, 52b, 52c and 52d to swing, the four-rod linkage assemblies 53a, 53b, 53c and 53d cooperatively drive the movable platform 20 to move along the Z-axis.

Figure 5:
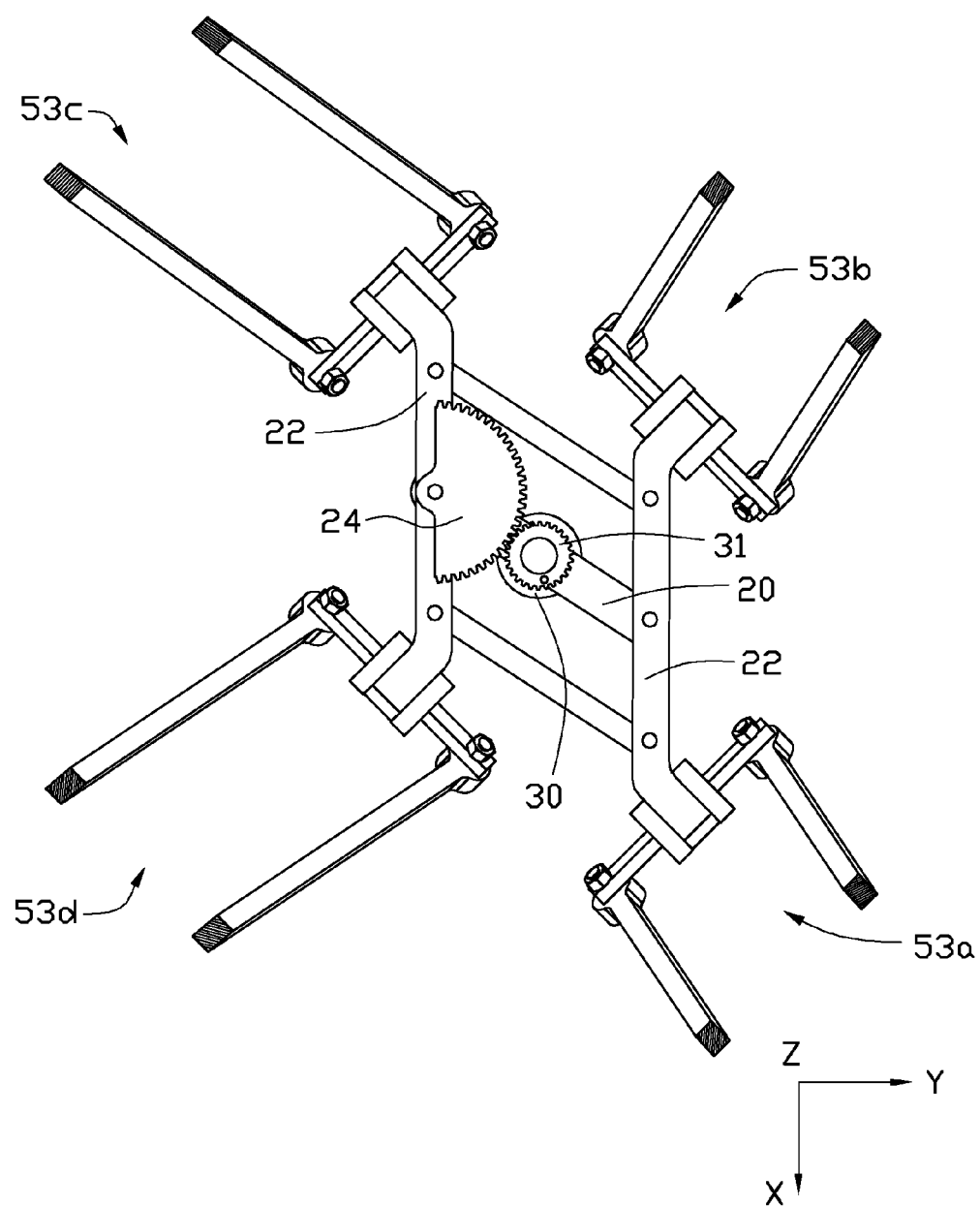
FIG. 5 is a partial, isometric view of the parallel robot of FIG. 1 showing a rotating state of the movable platform.

Referring to FIGS. 1 and 5, when the adjacent driving members 51a, 51b of the control arms 50a, 50b drive the action poles 52a, 52b to swing, and the driving members 51c, 51d of the control arms 50c, 50d are not activated, thus, the control arms 50c, 50d will swing together with the control arms 52a, 52b. As a result, the four-rod linkage assemblies 53a, 53b drive the rotating member 22 connected to the four-rod linkage assemblies 53a, 53b to rotate relative to the main body 21, simultaneously, the four-rod linkage assemblies 53c, 53d are driven to swing, and the other rotating member 22 is driven to rotate relative to the main body 21 by the four-rod linkage assemblies 53c, 53d.

The first gear 24 is driven to rotate by the rotating member 22, and thus the second gear 31 is driven to rotate by the first gear 24. As a result, the actuator 30 connected to the second gear 31 rotates about the Z-axis.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A parallel robot, comprising:
a base;
a movable platform;
an actuator mounted on the movable platform; and
four control arms interconnecting between the base and the movable platform;
wherein each control arm comprises a driving member connected to the base, an action pole driven by the driving member, and a four-rod linkage assembly interconnected between the action pole and the movable platform; the four-rod linkage assembly comprises a first connecting rod, a second connecting rod, a first swing arm, and a second swing arm; the first connecting rod is connected to the action pole via the first rotary joint, and the second connecting rod is connected to the movable platform via the second rotary joint, one end of the first swing arm and the second swing arm is rotatably connected to the first connecting rod via a plurality of third rotary joints, respectively, the other end of the first swing arm and the second swing arm is rotatably connected to the second connecting rod via the fourth rotary joints, respectively, and a rotation axis of the first rotary joint is constantly substantially parallel to a rotation axis of the second rotary joint, rotation axes of the third rotary joints are constantly substantially perpendicular to the rotation axis of the first rotary joint, and rotation axes of the fourth rotary joints are constantly substantially perpendicular to the rotation axis of the second rotary joint.

2. The parallel robot of claim 1, wherein the movable platform comprises a main body and two rotating members positioned on the main body and opposite to each other, and two second connecting rods of two adjacent four-rod linkage assemblies are connected to one rotating member via two of the plurality of second rotary joints, and another two second connecting rods of another two adjacent four-rod linkage assemblies are connected to the other rotating member via another two of the plurality of second rotary joints.

3. The parallel robot of claim 2, wherein the movable platform further comprises a first gear fixedly mounted on one rotating member, and a second gear fixed on the actuator; the actuator is rotatably connected to the movable platform, and the first gear meshes with the second gear.

4. The parallel robot of claim 3, wherein the first gear is a straight-tooth involute gear having semi-circular shape.

5. The parallel robot of claim 2, wherein the main body comprises two parallel fixing plates, and the two fixing plates and the two rotating members cooperatively form a parallelogram.

6. The parallel robot of claim 1, wherein the second connecting rod is parallel to the first connecting rod, and the first swing arm is parallel to the second swing arm.

7. The parallel robot of claim 1, wherein the second connecting rods of opposite four-rod linkage assemblies are parallel to each other.

8. The parallel robot of claim 1, wherein the four control arms are evenly arranged on a periphery of the base.

9. The parallel robot of claim 1, wherein the driving member is a servo motor.

10. A parallel robot, comprising:
a base;
a movable platform;
four control arms interconnecting between the base and the movable platform;
wherein each control arm comprises a driving member connected to the base, an action pole driven by the driving member, and an four-rod linkage assembly interconnected between the action pole and the movable platform; the four-rod linkage assembly comprises a first connecting rod, a second connecting rod, a first swing arm, and a second swing arm; the first connecting rod is connected to the action pole via the first rotary joint, and the second connecting rod is connected to the movable platform via the second rotary joint, one end of the first swing arm and the second swing arm is rotatably connected to the first connecting rod via a plurality of third rotary joints, respectively, the other end of the first swing arm and the second swing arm is rotatably connected to the second connecting rod via the fourth rotary joints, respectively, and a rotation axis of the first rotary joint is constantly substantially parallel to a rotation axis of the second rotary joint, rotation axes of the third rotary joints are constantly substantially perpendicular to the rotation axis of the first rotary joint, and rotation axes of the fourth rotary joints are constantly substantially perpendicular to the rotation axis of the second rotary joint.

11. The parallel robot of claim 10, wherein the movable platform comprises a main body and two rotating members positioned on the main body and opposite to each other, and two second connecting rods of two adjacent four-rod linkage assemblies are connected to one rotating member via two of the plurality of second rotary joints, and another two second connecting rods of another two adjacent four-rod linkage assemblies are connected to the other rotating member via another two of the plurality of second rotary joints.

12. The parallel robot of claim 11, wherein the movable platform further comprises a first gear fixedly mounted on one rotating member, and a second gear fixed on the actuator; the actuator is rotatably connected to the movable platform, and the first gear meshes with the second gear.

13. The parallel robot of claim 12, wherein the first gear is a straight-tooth involute gear having semi-circular shape.

14. The parallel robot of claim 11, wherein the main body comprises two parallel fixing plates, and the two fixing plates and the two rotating members cooperatively form a parallelogram.

15. The parallel robot of claim 10, wherein the second connecting rod is parallel to the first connecting rod, and the first swing arm is parallel to the second swing arm.

16. The parallel robot of claim 10, wherein the second connecting rods of opposite four-rod linkage assemblies are to each other.

17. The parallel robot of claim 10, wherein the four control arms are evenly arranged on a periphery of the base.

18. The parallel robot of claim 10, wherein the driving member is a servo motor.

* * * * *